Aug. 4, 1970 C. F. BANCROFT 3,522,549

AUTOMATIC FREQUENCY CONTROL LOOP WITH FREQUENCY DISCRIMINATOR AND DIGITAL COUNTER

Filed April 25, 1967 3 Sheets-Sheet 1

INVENTOR.
CHARLES F. BANCROFT,
BY Victor Sepulveda
AGENT.

United States Patent Office 3,522,549
Patented Aug. 4, 1970

3,522,549

AUTOMATIC FREQUENCY CONTROL LOOP WITH FREQUENCY DISCRIMINATOR AND DIGITAL COUNTER

Charles F. Bancroft, Sherman Oaks, Calif., assignor to Hughes Aircraft Company, Culver City, Calif., a corporation of Delaware Filed Apr. 25, 1967, Ser. No. 633,471
Int. Cl. H03b 3/04
U.S. Cl. 331—17 6 Claims

ABSTRACT OF THE DISCLOSURE

A feedback control loop includes a counter which increments in a first or second direction in relation to the polarity of the output of a signal discriminator and accumulates increments in relation to the number of increments in any given polarity. These increments are then applied to a resistive adder which converts these incremental signals to an analog representation thereof which is then used to control a controllable oscillator used in the feedback control loop.

BACKGROUND OF THE INVENTION

This invention relates to control system and more particularly to a novel and improved control system employing a unique signal converter which is capable of holding the frequency between a transmission means and a controllable oscillator or the like at a constant value for an indefinite period of time as determined by a control signal.

The present invention is useful in radar systems, for example, where it is desired to hold a controllable oscillator such as a voltage controlled oscillator (VCO) constant for a single antenna scan or some other time interval where the short term stability of the VCO and a transmitter used with the radar systems would be adequate, but where some readjustments from time to time would be required due to long term frequency drift. This system replaces the more complicated automatic frequency control systems (AFC) of the prior art to accomplish the same short term stability.

In radar systems, the transmitter is normally pulsed and the output of the mixer used with the transmitter is a burst of power at the difference frequency between the transmitter and the voltage controlled oscillator (VCO). In this case, the power is low since the VCO is at its highest frequency. When power is first applied, the voltage is applied to electrical integrators or the like, placing them at their maximum positive values. This results in the voltage across the integrator being its most positive value, which in turn causes the VCO to be at its highest frequency.

The output of discriminators used with the automatic frequency control is a negative pulse which triggers a flip flop and causes the voltage at the integrator to start decreasing, which in turn causes the frequency of the VCO to decrease. When the frequency at the output on the mixer crosses over as indicated by the discriminator, the pulses at the output of the discriminator will change polarity causing an associated flip flop to change state. Thus, the difference frequency at the output of the mixer will swing around the crossover frequency with the flip flop being triggered every time the polarity of pulses changes at the output of the discriminator.

The major disadvantage with these prior art automatic frequency control systems is that integrating capacitors are required and it is impossible that the frequency of the VCO be held constant for any length of time by applying a control system.

The present invention provides a voltage controlled oscillator frequency which can be held constant for any desired length of time when applying a control signal. The present invention eliminates the integrating capacitor completely and lends itself very readily to application of building the circuitry of integrated circuitry.

SUMMARY OF THE INVENTION

Briefly described, the present invention provides an automatic frequency control system used with transmission means such as the transmitter of a radar system or the like and employs a digital counter for providing the control frequencies from the mixer to the voltage controlled oscillator. When the desired lock-on frequency of the VCO is below that of the transmitter, and the VCO is very far below the transmitter on initial turnon, the pulse RF signal from the transmitter is combined in a mixer with a continuous wave (CW) VCO signal and results in a burst of power at the output of the mixer which is the difference frequency between the transmitter and the voltage controlled oscillator.

If the frequency at the output of the mixer is above the crossover frequency of a discriminator used therewith, a positive pulse will appear at the output of the discriminator and if the frequency at the output of the mixer is below the crossover frequency of the discriminator, a negative pulse will appear at the output thereof. These pulses are amplified to an amplitude sufficient to trigger a counter after passing through a phase splitter and a sample and hold gate. When the hold signal is present, the output of the video amplifier is removed from the phase splitter and a counter stores the last count until the hold signal is removed. The phase splitter then converts the negative pulses to positive pulses which cause countdown of the counter and pass positive pulses unchanged to cause countup of the counter. The counter counts up as long as the positive pulses are present and counts down as long as negative pulses are present. The outputs of the counter are summed in a resistor adder and the output therefrom is modified by buffer amplifier to the impedance and voltage levels required to control the VCO. As the counter counts up, the output of the buffer becomes more positive which in turn causes the frequency of the VCO to increase. As this frequency increases, the frequency from the output of the mixer will decrease until the crossover frequency of the discriminator is reached. At this time, the polarity of the pulses at the output of the discriminator will change and the counter will start to count down. The counter will count up and down alternately one count around the crossover point of the discriminator and thus hold the frequency difference between the transmitter and the VCO constant.

It therefore becomes one object of this invention to provide a novel and improved automatic frequency control system.

Another object of this invention is to provide a novel and improved automatic frequency control system which eliminates the use of storage capacitors or the like.

Another object of this invention is to provide an automatic frequency control system which is useful in radar systems to hold a controllable oscillator constant for a predetermined time interval.

Another object of this invention is to provide a novel and improved automatic frequency control system which requires very little readjustment from time to time due to long term frequency drift.

The advantages of the present invention over the prior art is that it provides an automatic frequency control system which is less complicated and is completely digitized and therefore more reliable and also provides a system which is easily adapted to integrated circuitry.

The main advantage of the system is that the local oscillator frequency can be held constant for any desired length of time by applying a control signal. This is difficult to do with the prior art method using a flip flop and integrator with a practical size of capacitor. The present invention completely eliminates this integrating capacitor.

These and other features, objects and advantages will become more apparent to those skilled in the art when referring to the following detailed description taken into consideration with the following drawings wherein like reference numerals indicate like or corresponding parts throughout the several views and wherein.

Figure 3A:
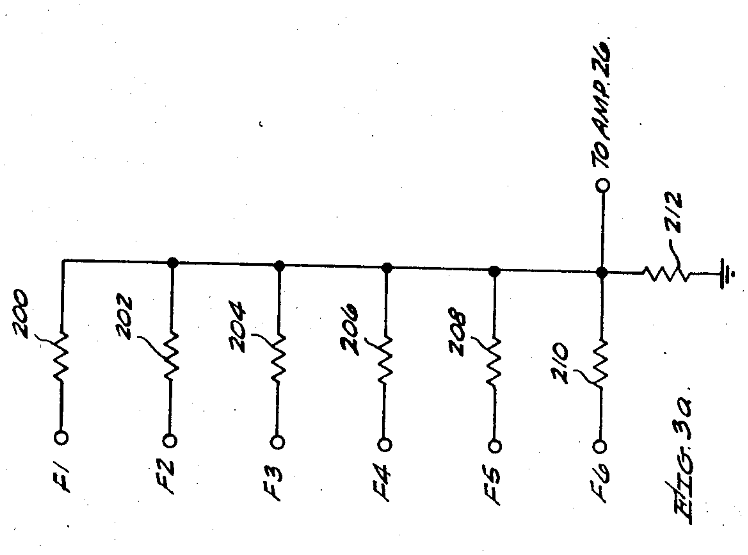
Figure 1:
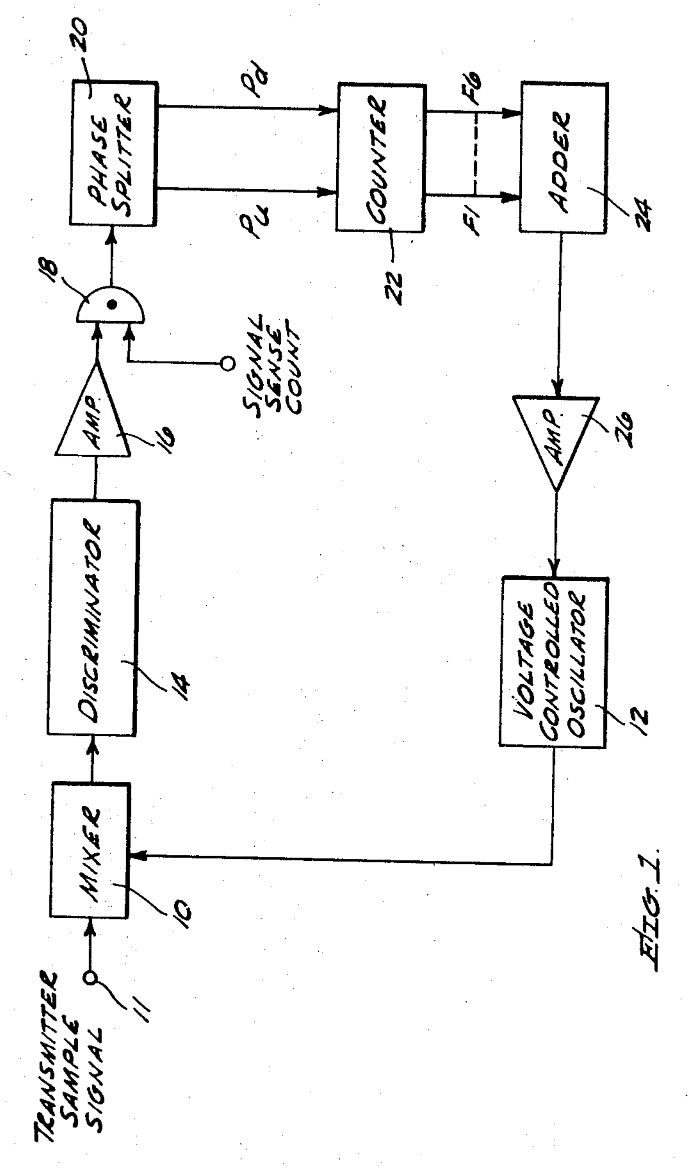
FIG. 1 is a simplified block diagram of one preferred embodiment of this invention.
Figure 3B:
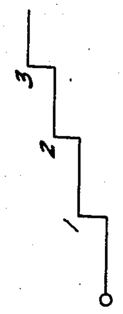
Figure 5:
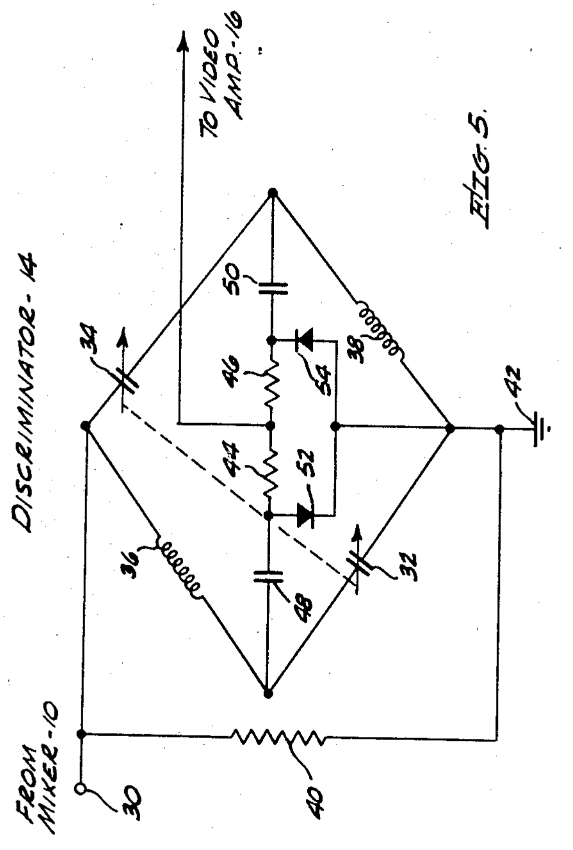
Figure 4:
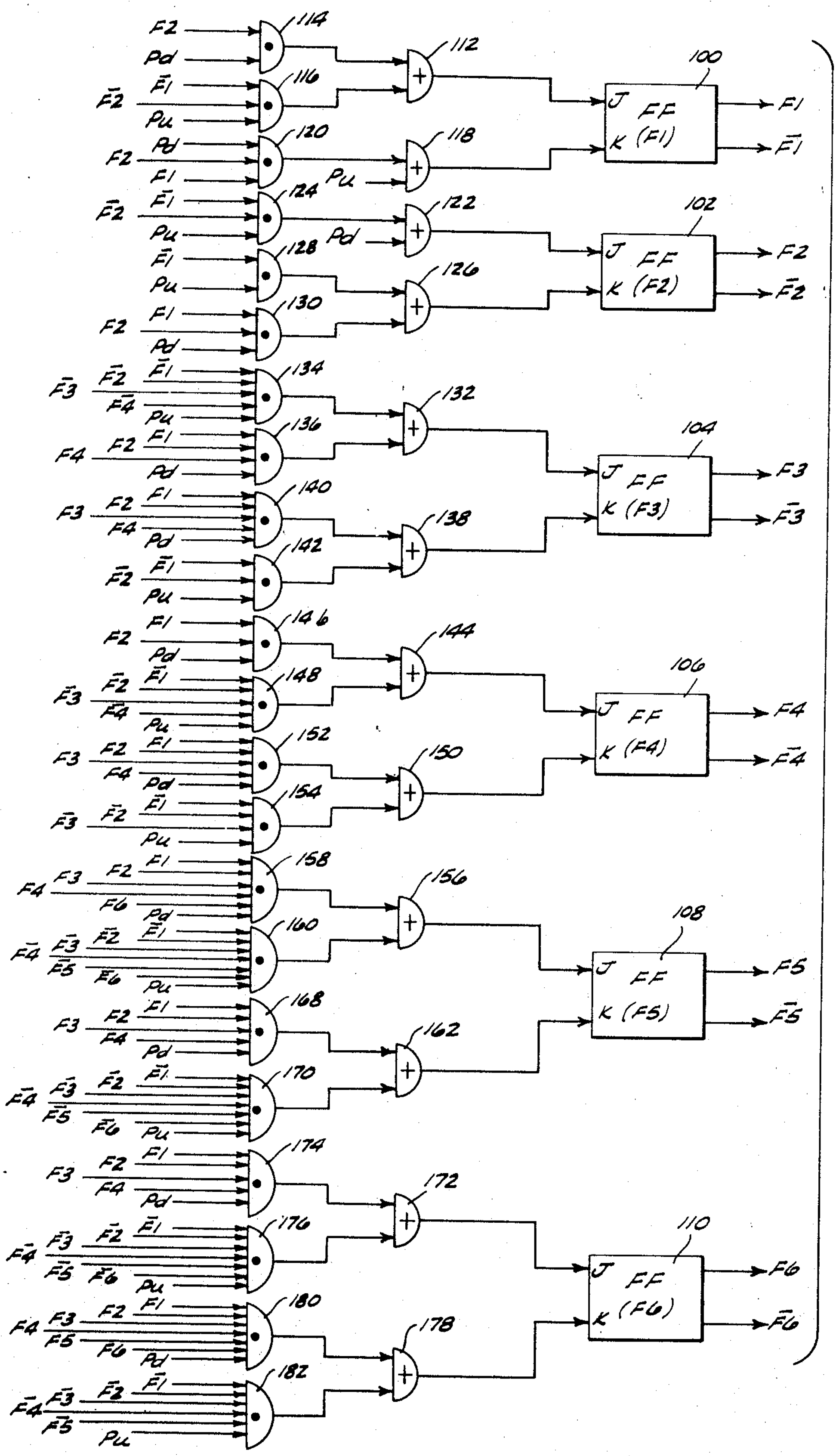

FIG. 3*a* is a schematic block diagram of the circuitry of the resistive adder shown in the embodiment of FIG. 1;

FIG. 3*b* is a graph of signals which may appear at the output of the adder of FIG. 3;

FIG. 4 is a block diagram of the counter used with this invention and the steering logic used therewith; and FIG. 5 is an electrical schematic of a discriminator as shown in FIG. 1.

DESCRIPTION OF ONE PREFERRED EMBODIMENT

Turning now to a more detailed description of the preferred embodiment as shown in FIG. 1, the numeral 10 indicates a mixer which receives and mixes a sample of the transmitter signal received at terminal 11 with the signal of a local oscillator which may be in the form of a voltage controlled oscillator 12 which is used to control the output of mixer to the IF band and in this embodiment a 30 mHz. IF is desired. The output of the mixer 10 is applied to a wide band discriminator 14 which is fixed at the IF band of 30 mHz., which in turn has its output coupled to a video amplifier 16. The amplifier 16 may have its output coupled to a count hold gate 18 which applies the signal therefrom to a phase splitter 20. The purpose of the count hold gate 18, which may be in the form of an AND gate, is to hold the last signal received at terminal 11. This stops a counter 22 from counting and shuts off the input signal. Phase splitter 20 has a pair of outputs coupled to an up/down reversible counter 22. The output of all the stages comprised in counter 22 is coupled to a resistive adder 24 which in turn is coupled to an amplifier 26. The output of amplifier 26 is coupled to control voltage controlled oscillator 12.

Figure 2:
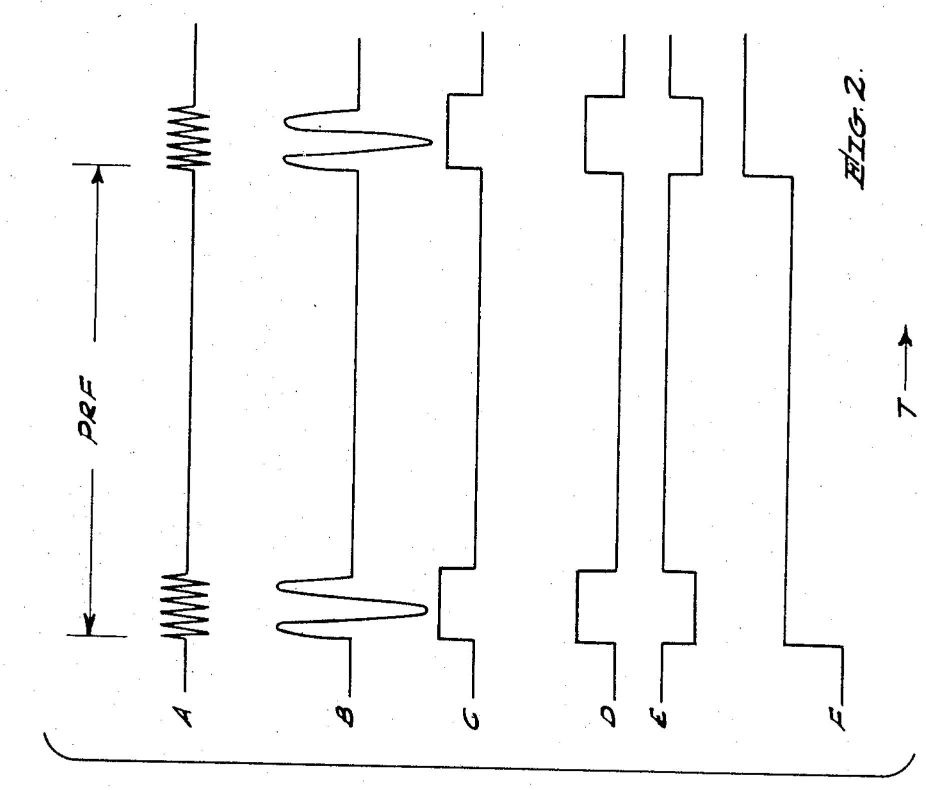
FIG. 2 is a graphic illustration of signals as they appear at various points in the system shown in FIG. 1.

In operation it is assumed that the desired lock-on frequency of voltage controlled oscillator 12 is below the frequency from the transmitter which is applied to terminal 11 of mixer 10 and that voltage controlled oscillator 12 is operating at an even lower frequency than the transmitter at initial turn-on. The pulse RF signal from the transmitter as shown in graph A of FIG. 2, is combined in mixer 10 with the continuous wave (CW) signal from voltage control oscillator 12 and results in a burst of power at the output of mixer 10 as shown in graph B of FIG. 2, which is at the difference frequency between the transmitter sample signal (graph A) applied to mixer 10 and the output signal from VCO 12 to mixer 10. The signal from mixer 10 is detected by discriminator 14 and amplified by amplifier 16 to generate the square wave shown in graph C of FIG. 2. If the frequency at the output of mixer 10 is above a specified crossover frequency of wide band discriminator 14, a positive output pulse will appear at the output of discriminator 14, as shown by graph D of FIG. 2, and if the frequency at the output of mixer 10 is below the aforesaid crossover frequency of discriminator 14, a negative pulse will appear at the output of discriminator 14 as shown by graph E of FIG. 2. These pulses are amplified by amplifier 16 to an amplitude sufficient to trigger the counter 22 after passing through count hold gate 18 and phase splitter 20. When a hold signal, which is referred to a count sense signal, which signal is supplied by some outside source, is absent from an input of hold gate 18, the output of amplifier 16 is removed from the phase splitter 20 whereby counter 22 stores the last count received until the count is reapplied to hold gate 18.

Phase splitter 20 converts negative pulses to positive pulses, P*d*, which are applied to the countdown circuitry of counter 22 on a first lead and passes positive pulses, P*u*, unchanged on a second lead to the countup circuitry provided in counter 22. Counter 22 counts up as long as positive pulses are present from the discriminator 14, and counts down as long as negative pulses are present from discriminator 14. The output of all of the stages in counter 22 are then summed in the resistive adder 24 which is exemplified in FIGS. 3*a* and 3*b*. The output of adder 24 is modified by amplifier 26 to the impedance and voltage levels required to control VCO 12. As counter 24 counts up, the output of amplifier 26 as shown by graph F of FIG. 2, becomes more positive, which in turn causes the frequency of VCO 12 to increase. As the frequency of VCO 12 increases, the frequency at the output of mixer 10 will decrease until a crossover frequency of discriminator 14 is reached. At this point, the polarity of the pulses at the output of discriminator 14 will change and counter 22 will start to count down. Counter 22 will count up and count down alternately one count around the crossover point of discriminator 14 and thus hold the frequency difference between the transmitter and the voltage controlled oscillator 12 constant and at the desired 30 mHz.

With reference to FIG. 5, an electrical schematic diagram of a typical wide band discriminator 14 as shown in FIG. 1 is provided and includes an input lead 30 which is coupled to the output of mixer 10 and to a bridge circuit comprising a pair of capacitors 32 and 34 and a pair of inductors 36 and 38 coupled in the bridge configuration. Terminal 30 is also coupled through resistor 40 to a ground reference 42. A pair of resistors 44 and 46 are coupled in series with a pair of capacitors 48 and 50 and shunted between inductor 36 and capacitor 32 and inductor 38 and capacitor 34. A diode 52 has its anode electrode coupled between capacitor 48 and resistor 44 and its cathode electrode coupled to the ground reference 42. A second diode 54 has its cathode coupled between resistor 46 and capacitor 50 and has its anode electrode coupled to ground reference 42. The output which is coupled to amplifier 16 is taken between resistors 44 and 46.

A pulse appearing in either polarity at the output of discriminator 14 is sufficient to trigger counter 22. Discriminator 14 may, for example, have an output of 35 mv. FIG. 5 illustrates that the discriminator consists of a low pass and a high pass filter, the outputs of which are DC restored and added by means of resistors 44 and 46. Capacitors 32 and 34 are ganged together and control the crossover frequency. Inductor 26 controls the slope at crossover. For optimum operation the stray capacitance of inductors 36 and 38 and capacitors 32 and 34 with respect to each other and ground should be kept low, preferably less than 1.5 pf.

With reference now to FIG. 4, there is shown a plurality of flip flops 100, 102, 104, 106, 108 and 110. F1 flip flop 100 provides a pair of outputs F1 and $\overline{F1}$ and has a J input and a K input. As is well known to those skilled in the art, the JK flip flop is capable of changing states from true to false or vice versa on its two output terminals (i.e., F and $\overline{F}$), if a positive pulse is applied to both the JK inputs simultaneously. If a positive input pulse is applied to the J terminal of a flip flop previously set true, the flip flop will change to a true state, but if the flip flop is false and the J input is enabled, the flip flop will not change. On the other hand, should the flip flop be true and its K input is enabled, the flip flop will change to false. If the flip flop is already in a false state and the K input is enabled, the flip flop will change to a true state.

The J and K input of F1 flip flop 100 is enabled by the following equation stated in Boolean notations:

$$F1\ (J)=\overline{F1}\cdot\overline{F2}\cdot Pu+F2\cdot Pd \qquad \text{(Eq. 1)}$$
$$F1\ (K)=F1\cdot F2\cdot Pd+Pu$$

With reference to FIG. 4, logic diagrams are shown for the implementation of the logic notations. An OR gate 112 is enabled by the output of a pair of AND gates 114 and 116. AND gate 114 is enabled by an F2 and a P*d*. F2 being the true output of the next preceding flip flop 102, while the P*d* indicates a pulse down from phase splitter 20. AND gate 116 is enabled by an $\overline{F1}$ indicating that the F1 flip flop 100 is set false, an $\overline{F2}$ indicating the F2 flip flop 102 is set false, and a P*u* indicating "pulse up" from the phase splitter 20. F1 flip flop 100 has a K input from OR gate 118, which is enabled by a P*u* and the output of AND gate 120, which AND gate is enabled by P*d*, an F2 indicating that F2 flip flop 102 is true and an F1 indicating that F1 flip flop 100 is set true.

F2 flip flop 102 is enabled by the following Boolean notation:

$$F2\ (J)=\overline{F1}\cdot\overline{F2}\cdot Pu+Pd \qquad \text{(Eq. 2)}$$
$$F2\ (K)=F2\cdot F1\cdot Pd+\overline{F1}\cdot Pu$$

The logic equation aforesaid for enabling F2 flip flop 102 can be implemented by the logic diagram as shown in FIG. 4 wherein the J input to F2 flip flop 102 is enabled by the output of OR gate 122 which OR gate is enabled by P*d* and the output from AND gate 124. AND gate 124 is enabled by an $\overline{F1}$, and $\overline{F2}$ and a P*u*. The K input of F2 flip flop 102 is enabled by the output of an OR gate 126 which in turn is enabled by the output of AND gate 128 or AND gate 130. AND gate 128 is enabled by an $\overline{F1}$ and a P*u* and AND gate 130 is enabled by an F1, F2 and a P*d*.

F3 flip flop 104 is enabled by the following logic equation:

$$F3\ (J)=\overline{F1}\cdot\overline{F2}\cdot\overline{F3}\cdot\overline{F4}\cdot Pu+F1\cdot F2\cdot F4\cdot Pd \qquad \text{(Eq. 3)}$$
$$F3\ (K)=F1\cdot F2\cdot F3\cdot F4\cdot Pd+\overline{F1}\cdot\overline{F2}\cdot Pu$$

The above logic equation can be enabled by the steering logic as shown in FIG. 4 with reference to the F3 flip flop 104 and the J input thereof is enabled by the output of OR gate 132, which in turn is enabled by a pair of AND gates 134 and 136. AND gate 134 is enabled by an $\overline{F1}$, an $\overline{F2}$, an $\overline{F3}$, an $\overline{F4}$ and a P*u*. AND gate 136 is enabled by an F1, F2, F4 and a P*d*. The K input to F3 flip flop 104 is enabled by the output of OR gate 138, which in turn is enabled by the output of AND gate 140 or the output of an AND gate 142. AND gate 140 is enabled by an F1, F2, F3, F4 and a P*d*. AND gate 142 is enabled by an $\overline{F1}$, an $\overline{F2}$ and a P*u*.

F4 flip flop 106 is enabled by the following Boolean notation:

$$F4\ (J)=F1\cdot F2\cdot Pd+\overline{F1}\cdot\overline{F2}\cdot\overline{F3}\cdot\overline{F4}\cdot Pu \qquad \text{(Eq. 4)}$$
$$F4\ (K)=F1\cdot F2\cdot F3\cdot F4\cdot Pd+\overline{F1}\cdot\overline{F2}\cdot\overline{F3}\cdot Pu$$

The above notation can be enabled by the logic diagrams shown in FIG. 4 with reference to F4 flip flop 106 and the J input thereof is enabled by the output of OR gate 144, which in turn is enabled by the output of AND gate 146 or 148. AND gate 146 is enabled by F1, F2 and a P*d*, and AND gate 148 is enabled by an $\overline{F1}$, $\overline{F2}$, $\overline{F3}$, $\overline{F4}$ and a P*u*. The K input of F4 flip flop 106 is enabled by the output of OR gate 150 which in turn is enabled by the output of AND gate 152 or 154. AND gate 152 is enabled by an F1, F2, F3, F4 and a P*d*, and AND gate 154 is enabled by an $\overline{F1}$, $\overline{F2}$, $\overline{F3}$ and a P*u*.

F5 flip flop 108 is enabled by the following logic equation:

$$F5\ (J)=F1\cdot F2\cdot F3\cdot F4\cdot F6\cdot Pd+\overline{F1}\cdot\overline{F2}\cdot\overline{F3}\cdot\overline{F4}\cdot\overline{F5}\cdot\overline{F6}\cdot Pu \qquad \text{(Eq. 5)}$$
$$F5\ (K)=F1\cdot F2\cdot F3\cdot F4\cdot Pd+\overline{F1}\cdot\overline{F2}\cdot\overline{F3}\cdot\overline{F4}\cdot\overline{F5}\cdot\overline{F6}\cdot Pu$$

The above logic can be implemented by the logic diagram shown in FIG. 4 wherein the J input of F5 flip flop 105 is enabled by the output of OR gate 156 which in turn is enabled by the output of AND gate 158 or the output of AND gate 160.

AND gate 158 is enabled by an F1, F2, F3, F4, F6 and a P*d*. AND gate 160 is enabled by an $\overline{F1}$, $\overline{F2}$, $\overline{F3}$, $\overline{F4}$, $\overline{F5}$, $\overline{F6}$ and a P*u*. The K input to F5 flip flop 108 is enabled by the output of an OR gate 162. OR gate 162 is enabled by the output of AND gate 168 or the output of AND gate 170. AND gate 168 is enabled by an F1, F2, F3, F4 and a P*d*, and AND gate 170 is enabled by an $\overline{F1}$, $\overline{F2}$, $\overline{F3}$, $\overline{F4}$, $\overline{F5}$, $\overline{F6}$ and a P*u*.

F6 flip flop 110 is enabled by the following logic noted in Boolean notations:

$$\text{(Eq. 6)}$$
$$F6\ (J)=F1\cdot F2\cdot F3\cdot F4\cdot Pd+\overline{F1}\cdot\overline{F2}\cdot\overline{F3}\cdot\overline{F4}\cdot\overline{F5}\cdot\overline{F6}\cdot Pu$$
$$F6\ (K)=F1\cdot F2\cdot F3\cdot F4\cdot F5\cdot F6\cdot Pd+\overline{F1}\cdot\overline{F2}\cdot\overline{F3}\cdot\overline{F4}\cdot\overline{F5}\cdot Pu$$

The above notations can be implemented as shown in the logic diagrams of FIG. 4 with reference to the F6 flip flop 110, where the J input thereof is enabled by the output of OR gate 172 and the OR gate 172 is enabled by the output of AND gate 174 or the output of AND gate 176. AND gate 174 is enabled by an F1, F2, F3, F4 and a P*d*. AND gate 176 is enabled by an $\overline{F1}$, $\overline{F2}$, $\overline{F3}$, $\overline{F4}$, $\overline{F5}$, $\overline{F6}$ and a P*u*. A K input F6 flip flop 110 is enabled by the output of an OR gate 178 and the OR gate 178 is enabled by the output of an AND gate 180 or the output of an AND gate 182. AND gate 180 is enabled by an F1, F2, F3, F4, F5, F6 and P*d*. The AND gate 182 is enabled by an $\overline{F1}$, $\overline{F2}$, $\overline{F3}$, $\overline{F4}$, $\overline{F5}$ and P*u*.

The outputs from the counter 22 are the outputs F1, F2, F3, F4, F5, F6 from their associated flip flops. These outputs are coupled into the resistive adder as shown in FIG. 3 and for explanation purposes, the resistors 200, 202, 204, 206, 208 and 210 may have ohmic values as follows:

Resistors 200 and 202 may have a value of 11.0K. Resistors 204 and 206 may have a value of 32.4K, and the resistors 208 and 210 have a value of 100K. These resistors are all coupled to their respective output of flip flops F1 to F6 and the other ends thereof are coupled together and through a ground resistor 212 to ground. The output is also taken from this common and is applied to the amplifier 26 of FIG. 1.

It should be noted that the F1 and F2 outputs of F1 flip flop and F2 flip flop are coupled to resistors 200 and 202 respectively which are paired in their ohmic value. F3 flip flop 104 and F4 flip flop 106 are coupled to resistors 204 and 206 respectively which are paired in their ohmic values and are approximately three times the weight of the resistors 200 and 202. And finally, F5 flip flop 108 and F6 flip flop 110 are coupled to the resistors 208 and 210 respectively, which have an ohmic value three times that of resistors 204 and 206 and nine times that of resistors 200 and 202.

For operation of the counter 22 with respect to the adder 24, reference is made to the following table:

| | Ohmic value | | | | | |
|---|---|---|---|---|---|---|
| | 1 | | 3 | | 9 | |
| | F1 | F2 | F3 | F4 | F5 | F6 |
| Pulses: | | | | | | |
| 0 | 0 | 0 | 0 | 0 | 0 | 0 |
| 1 | 1 | 0 | 0 | 0 | 0 | 0 |
| 2 | 1 | 1 | 0 | 0 | 0 | 0 |
| 3 | 0 | 0 | 1 | 0 | 0 | 0 |
| 4 | 1 | 0 | 1 | 0 | 0 | 0 |
| 5 | 1 | 1 | 1 | 0 | 0 | 0 |
| 6 | 0 | 0 | 1 | 1 | 0 | 0 |
| 7 | 1 | 0 | 1 | 1 | 0 | 0 |
| 8 | 1 | 1 | 1 | 1 | 0 | 0 |
| 9 | 0 | 0 | 0 | 0 | 1 | 0 |
| 10 | 1 | 0 | 0 | 0 | 1 | 0 |
| 11 | 1 | 1 | 0 | 0 | 1 | 0 |
| 12 | 0 | 0 | 1 | 0 | 1 | 0 |
| 13 | 1 | 0 | 1 | 0 | 1 | 0 |
| 14 | 1 | 1 | 1 | 0 | 1 | 0 |
| 15 | 0 | 0 | 1 | 1 | 1 | 0 |
| 16 | 1 | 0 | 1 | 1 | 1 | 0 |
| 17 | 1 | 1 | 1 | 1 | 1 | 0 |
| 18 | 0 | 0 | 0 | 0 | 1 | 1 |
| 19 | 1 | 0 | 0 | 0 | 1 | 1 |
| 20 | 1 | 1 | 0 | 0 | 1 | 1 |
| 21 | 0 | 0 | 1 | 0 | 1 | 1 |
| 22 | 1 | 0 | 1 | 0 | 1 | 1 |
| 23 | 1 | 1 | 1 | 0 | 1 | 1 |
| 24 | 0 | 0 | 1 | 1 | 1 | 1 |
| 25 | 1 | 0 | 1 | 1 | 1 | 1 |
| 26 | 1 | 1 | 1 | 1 | 1 | 1 |

Note that the first pulse presented to counter 22 will set F1 flip flop 100 true. The second pulse keeps F1 true and sets F2 true, and the third pulse will set F1 flip flop false, F2 flip flop false, and set F3 flip flop true. With the aforesaid ohmic values given to the resistors of adder 24, the output to amplifier 26 is a step voltage as shown in FIG. 3*b* which increases proportionately as the pulse up or pulse down is applied to counter 22. Note also that no matter what condition counter 22 is in, it will always remain there until pulsed from phase splitter 20.

Having thus described one preferred embodiment of this invention, what is claimed is:

1. An automatic frequency control system comprising:

a mixer having a first input circuit and a second input circuit, and an output circuit, the first input circuit being capable of receiving a sample signal;

a discriminator having an input circuit coupled to the output circuit of said mixer and an output circuit;

a phase splitter having an input circuit coupled to the output circuit of said discriminator and a pair of output circuits;

a counter having a pair of input circuits coupled to the pair of output circuits of said phase splitter and a plurality of output circuits;

an adder having a plurality of input circuits coupled to the plurality of output circuits of said counter and having an output circuit; and an oscillator having an input control circuit coupled to the output circuit of said adder and an output circuit coupled to the second input circuit of said mixer.

2. The automatic frequency control system as defined in claim 1 and further comprising:

logic circuitry capable of causing said counter to count in a first direction if a selected one of the pair of output circuits of said phase splitter is energized and causing said counter to count in a second mode if the other of said pair of the output circuits of said phase splitter is enabled.

3. The automatic frequency control system as defined in claim 1 wherein said adder comprises a plurality of pairs of resistors coupled to said plurality of output circuits of said counter, each resistor in said pair of said adder being of an equal ohmic value and each adjacent pair of said resistors progressing in value relative to adjacent pairs.

4. The automatic frequency control circuit as defined in claim 3 wherein said adjacent pair of resistors progress in value by a factor of three.

5. The automatic frequency control system as defined in claim 2 and wherein:

said adder comprises a plurality of pairs of resistors coupled to said plurality of output circuits of said counter, each resistor in said pair being of equal ohmic value and each adjacent pair of said resistors progressing in value relative to adjacent pairs.

6. The automatic frequency control system as defined in claim 5 wherein said adjacent pair of resistors progress in value by a factor of three.

References Cited

UNITED STATES PATENTS 2,923,889 2/1960 Salter ............ 331—30 X
3,050,693 8/1962 Sinninger ......... 331—30 X
3,265,986 8/1966 Wyckoff .......... 331—30 X
3,290,611 12/1966 Horlacher et al. ... 331—17 X ROY LAKE, Primary Examiner S. H. GRIMM, Assistant Examiner U.S. Cl. X.R.

331—1, 30, 33; 340—347